United States Patent
Tandler et al.

[11] Patent Number: 6,088,155
[45] Date of Patent: Jul. 11, 2000

[54] DEVICE FOR SWITCHING THE OPERATING MODES OF A MICROSCOPE TUBE

[75] Inventors: Hans Tandler, Jena; Hubert Wahl, Stadtroda, both of Germany

[73] Assignee: Carl Zeiss Jena GmbH, Jena, Germany

[21] Appl. No.: 09/011,357

[22] PCT Filed: Jun. 4, 1997

[86] PCT No.: PCT/EP97/02900

§ 371 Date: Jan. 7, 1999

§ 102(e) Date: Jan. 7, 1999

[87] PCT Pub. No.: WO97/46904

PCT Pub. Date: Dec. 11, 1997

[30] Foreign Application Priority Data

Jun. 4, 1996 [DE] Germany ............... 196 22 357

[51] Int. Cl.$^7$ .................................. G02B 21/00
[52] U.S. Cl. ........................... 359/381; 359/638
[58] Field of Search .................. 359/363, 381, 359/368, 629, 638

[56] References Cited

U.S. PATENT DOCUMENTS

| | | | |
|---|---|---|---|
| 4,685,776 | 8/1987 | Inoue et al. | 359/363 |
| 5,764,408 | 6/1998 | Otaki | 359/368 |
| 5,777,783 | 7/1998 | Endou et al. | 359/385 |
| 5,861,982 | 1/1999 | Takahama et al. | 359/381 |

*Primary Examiner*—Cassandra Spyrou
*Assistant Examiner*—Mark A. Robinson
*Attorney, Agent, or Firm*—McAulay Nissen Goldberg & Kiel, LLP

[57] ABSTRACT

A device for switching the operating modes of a microscope tube between the observation position, recording position and simultaneous observation and recording position, with a fully reflecting first element for full deflection of the radiation coming from the microscope objective, and with a partially reflecting second element for splitting the radiation coming from the microscope objective, wherein the first element and second element are arranged on a first guide carriage and second guide carriage which are displaceable jointly as well as opposite to one another in a plane.

9 Claims, 2 Drawing Sheets

DEVICE FOR SWITCHING THE OPERATING MODES OF A MICROSCOPE TUBE

BACKGROUND OF THE INVENTION

1. Field of the invention

The invention is directed to a device for switching the operating modes of a microscope tube between the observing position, the recording position, and the simultaneous observing and recording position.

2. Description of the related art

Microscope tubes for switchable binocular observation and photographic recording or for the connection of video cameras are often built with only two possible switching positions. This is due to the required width of the tube which usually amounts to three prism widths when two switching positions are provided and would amount to about five prism widths if three adjacent switching positions were provided. Assuming a prism width of 30 mm, this means a space requirement of 150 mm in width. However, in many applications there is a need for one-hundred percent observation as well as one-hundred percent photography and also a divider ratio between both operating modes with simultaneous availability of both binocular partial beam paths.

In U.S. Pat. No. 2,910,913, a continuous beam path, a partially reflecting prism, and a fully reflecting prism are arranged adjacent to one another in a spatially very wide arrangement. This arrangement is not very advantageous either in appearance or with respect to the space requirement and material requirement. In addition, a wide tube limits the accessibility and visibility of additional operating elements located on the microscope.

EP 85317 A1 describes a slide which is switchable in three positions and pushes a prism into the beam path in each case. This likewise has a negative influence on tube width.

DE 3636616 A1 provides two prisms and a switchable mirror which must be driven in a relatively elaborate manner by separate driving means.

DE 3318011 C2 is directed to an add-on device for stereo-microscopes with elements in a plurality of planes and different elaborate guides.

DE-U1-8712342 discloses a prism carriage which is only displaceable between two positions.

OBJECT AND SUMMARY OF THE INVENTION

The primary object of the invention is a space-saving, and nevertheless simple, arrangement for switching between the three operating modes: visual, photo and visual/photo.

This object is met according to the invention in a device for switching the operating modes of a microscope tube between the observation position, recording position and simultaneous observation and recording position comprising a microscope objective, a fully reflecting first element for full deflection of radiation coming from the microscope objective and a partially reflecting second element for splitting the radiation coming from the microscope objective. The first element and second element are arranged on a first guide carriage and a second guide carriage which are displaceable jointly as well as opposite to one another in a plane.

In the solution according to the invention, only three prism widths are needed for three switching positions in that two prisms which are individually displaceable relative to one another are provided and a compensating plate is advantageously provided above the prisms. This also advantageously results in a separate adjustment possibility for the two prisms, which is impossible when using a compact prism with two fields.

The invention is explained more fully in the following with reference to the schematic drawings.

DESCRIPTION OF THE PREFERRED EMBODIMENTS

Figure 1C:
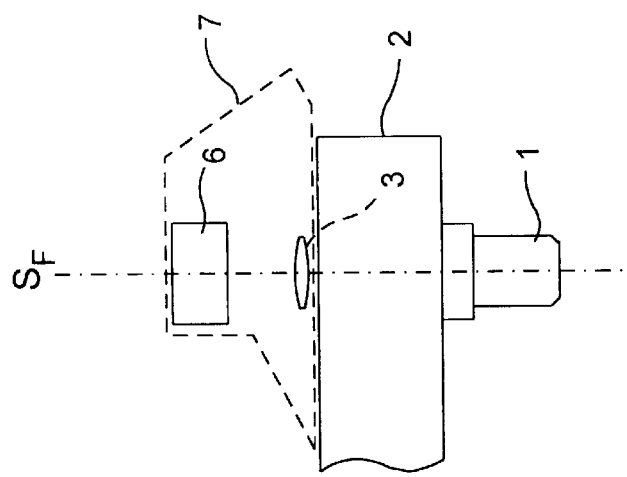
FIGS. 1a–c show schematic side views of a basic construction of a microscope in three different switching positions.
Figure 1A:
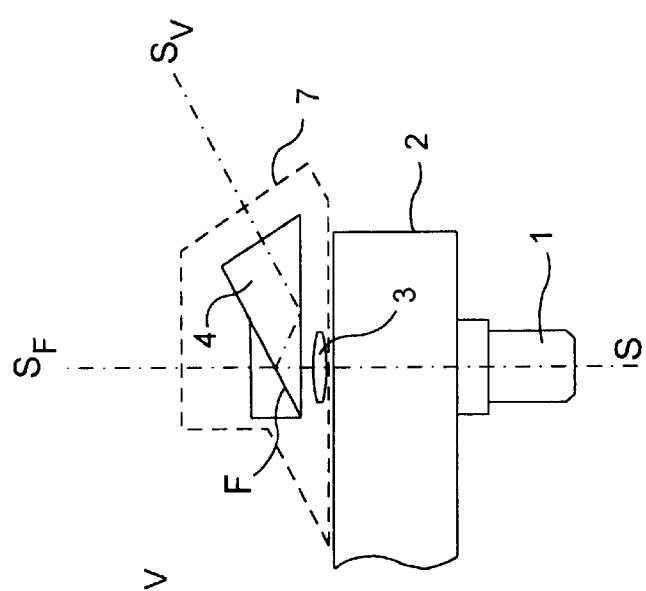
Figure 1B:
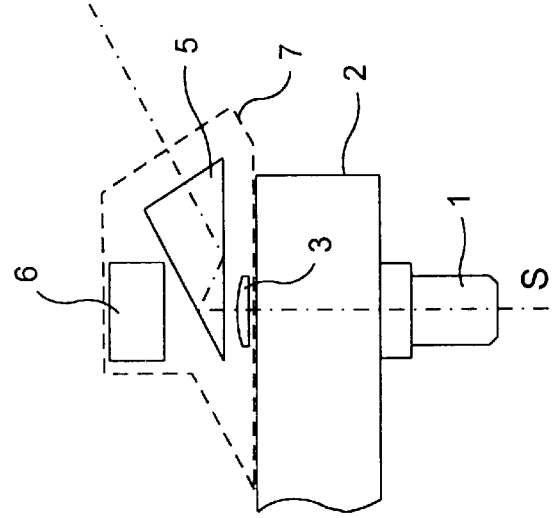

FIGS. 1a–c show schematic views of a microscope beam path S through an objective 1, a microscope carrier 2, a tube lens 3, and through a prism 4 in FIG. 1a, an additional prism 5 in FIG. 1b and a compensating element 6 in FIG. 3c.

Elements 4, 5, 6 and the tube lens 3 form a component part of a switchable tube 7 to which are connected a binocular view, not shown, designated herein as "visual" output, and a photographic device or video device, also not shown, which is designated herein as "photo" output. FIG. 1a shows, by way of example, a Bauernfeind prism as prism 4 with a partially transparent surface F which divides the beam S coming from the objective I into a visual part Sv in the direction of the binocular view, not shown, and into a portion Sf in the direction of the photographic or video recording.

The prism in FIG. 1b is fully reflecting at the reflecting surfaces and deflects the entire beam S coming from the objective 1 in the visual observation direction.

In FIG. 1c, only a compensating element 6 is provided in the beam path S. This compensating element 6 serves to compensate for the optical path length of the photographic recording with respect to the position in FIG. 1b and allows the entire beam path to pass in the recording direction.

Figure 2A:
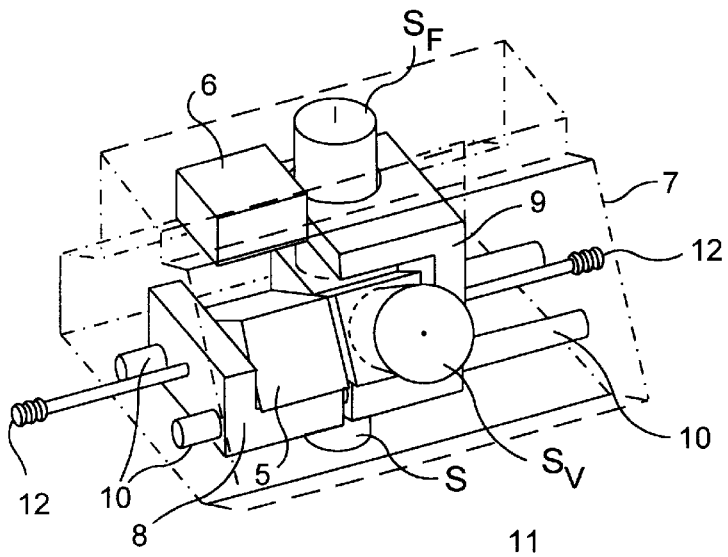
FIGS. 2a–c show the switching between the switching positions.
Figure 2B:
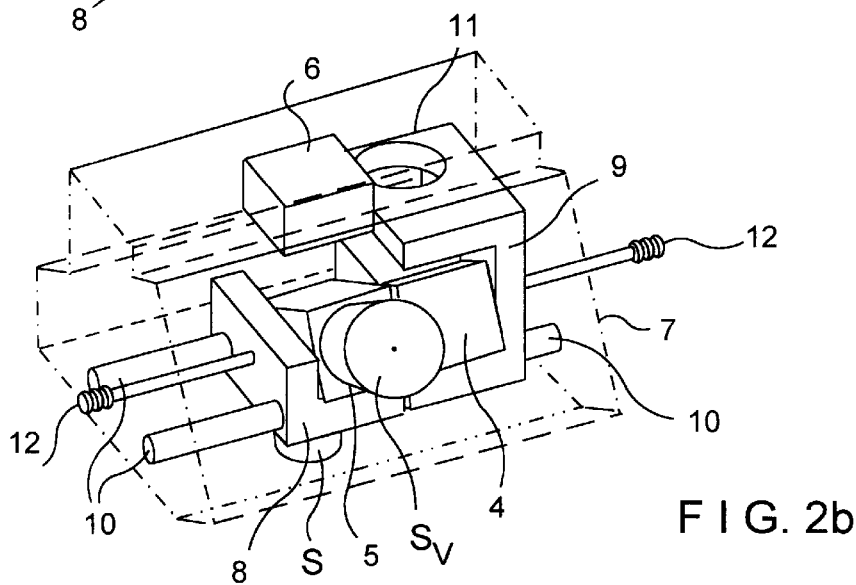
Figure 2C:
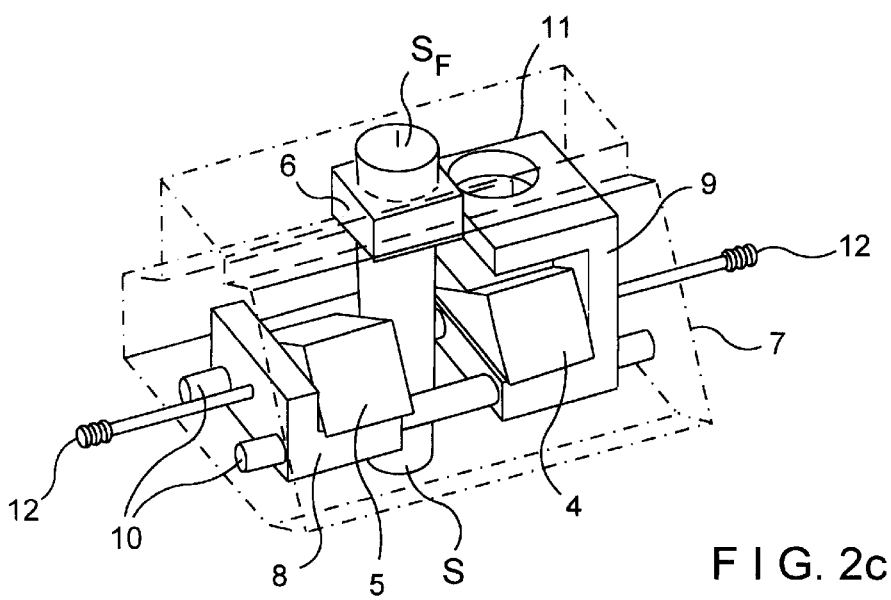

The switching between the individual switching positions according to FIGS. 1a–c is shown in the corresponding FIGS. 2a–c. The beam paths S, Sv and Sf are shown three-dimensionally as tubular light bundles. The prisms 4, 5 are fastened to separate guide carriages 8, 9 which are arranged on guide elements, in this case, guide rods 10, so as to be displaceable relative to one another.

The guide carriage 9 is constructed as an angular element having a light aperture 11, the compensating element 6 being fastened to the surface of the guide carriage 9 in such a way that it lies next to the light aperture 11.

Actuating elements, in this case the rods 12, which can be operated outside of the tube housing 7 are provided at the guide carriages 8, 9, wherein the carriages 8, 9 can be displaced relative to one another manually by means of the actuating elements.

A motor-driven displacement of the carriages on the guide elements is not in this way excluded and can easily be realized by familiar steps known in the art. In order to change between positions 2a and 2b, the carriages 8, 9 are displaced jointly along the rods 10, so that, instead of the partially reflecting prism 4 which generates the partial beam paths Sv and Sf, the prism 5 deflecting the entire beam path S is located in the beam path S coming from the objective 1. In this position, the compensating element 6 does not assist in imaging, since the entire beam S is deflected. If the prisms 4, 5 are moved apart by means of the rods 10, as is shown in FIG. 2c, the beam path is released through the prisms, so that the compensating element 6 is now situated in the beam path coming from the objective to compensate for the light path in the direction of the recording beam path.

The invention is not restricted only to the embodiment form shown herein. In particular, familiar variations known in the art with respect to the utilized guide carriages, the carriage guides, the optical elements used for switching and the fastening thereof, as well as the reversing of the observation beam path and recording beam path are also comprehended within the scope of the invention.

What is claimed is:

1. A device for switching the operating modes of a microscope tube between the observation position, recording position and simultaneous observation and recording position, comprising:

a microscope objective;

a fully reflecting first element for full deflection of radiation coming from the microscope objective;

a partially reflecting second element for splitting the radiation coming from the microscope objective, said first element and second element being arranged on a first guide carriage and second guide carriage which are displaceable jointly as well as opposite to one another in a plane; and a light-transmitting compensating element arranged on one of the carriages, the compensating element being located in the beam path coming from the microscope objective when the guide carriages are slid apart so that neither the first element nor the second element is located in the beam path.

2. The device according to claim 1, wherein the first guide carriage and second guide carriage are arranged on the same guide.

3. The device according to claim 1, wherein the compensating element is fastened to the second guide carriage.

4. The device according to claim 1, wherein the first element is constructed for the deflection of the beam (S) in the direction of observation, the second element is constructed for deflecting a portion (Sv) of the beam (S) in the direction of observation and a portion (Sf) in the direction of recording.

5. The device according to claim 1, wherein the compensating element is provided for compensating the light path in the direction of recording.

6. The device according to claim 1, wherein the first element and second element are prisms.

7. The device according to claim 1, wherein the guide carriages are displaceable on rod guides common to both guide carriages.

8. The device according to claim 1, wherein actuating elements which can be operated from the outside are provided at the guide carriages.

9. A device for switching the operating modes of a microscope tube between the observation position, recording position and simultaneous observation and recording position, comprising:

a microscope objective;

a fully reflecting first element for full deflection of radiation coming from the microscope objective;

a partially reflecting second element for splitting the radiation coming from the microscope objective, said first element and second element being arranged on a first guide carriage and second guide carriage which are displaceable jointly as well as opposite to one another in a plane; and a compensating element provided for compensating the light path in the direction of recording, the compensating element being fastened laterally to an angular element above the second element, the angular element having a light aperture.

* * * * *